(12) United States Patent
Yi et al.

(10) Patent No.: US 7,400,649 B2
(45) Date of Patent: Jul. 15, 2008

(54) METHOD OF GENERATING PROTOCOL DATA UNITS IN SPLIT MODE

(75) Inventors: Seung June Yi, Seoul (KR); Jin Young Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 594 days.

(21) Appl. No.: 09/877,197

(22) Filed: Jun. 11, 2001

(65) Prior Publication Data

US 2002/0001314 A1    Jan. 3, 2002

(30) Foreign Application Priority Data

Jun. 29, 2000    (KR)    ................................ 2000-36514

(51) Int. Cl.
*H04J 3/22*    (2006.01)
(52) U.S. Cl. ........................ 370/469; 370/470; 370/474; 370/336
(58) Field of Classification Search ................. 370/300, 370/464, 473, 474, 476, 336, 345, 470, 472, 370/335, 337, 342, 465, 469; 455/68, 434, 455/509, 515, 69; 714/18, 748–751
See application file for complete search history.

(56) References Cited

U.S. PATENT DOCUMENTS 5,477,550 A * 12/1995 Crisler et al. ............... 714/748
6,198,936 B1 * 3/2001 Yang et al. ................... 455/515
6,307,867 B1 * 10/2001 Roobol et al. ............... 370/470
6,363,058 B1 * 3/2002 Roobol et al. ............... 370/310
6,393,008 B1 * 5/2002 Cheng et al. ................ 370/338
6,477,670 B1 * 11/2002 Ahmadvand ................ 370/469
6,643,813 B1 * 11/2003 Johansson et al. ........... 714/748
6,684,081 B2 * 1/2004 Sarkkinen et al. ........... 455/515
6,701,151 B2 * 3/2004 Diachina et al. ......... 455/452.1
6,791,963 B1 * 9/2004 Hwang et al. ............... 370/342

FOREIGN PATENT DOCUMENTS

EP    1 156 617 A1    11/2001
WO    WO 00/08796    2/2000
WO    WO 00/21253    4/2000

* cited by examiner

*Primary Examiner*—Doris To
*Assistant Examiner*—Ian N. Moore
(74) *Attorney, Agent, or Firm*—Ked & Associates, LLP

(57) ABSTRACT

A method of generating protocol data units in a radio link control layer, which is set to an unacknowledged mode or an acknowledged mode, is disclosed. After producing a payload unit by segmenting and/or concatenating one or more service data units received from a higher layer, a protocol data unit including a sequence number corresponding to the payload unit and a protocol data unit including the payload unit itself are generated and transmitted separately to a media access control layer through a pair of different channels. Therefore, the PDUs having the sequence number can be transmitted in a low rate in order to reduce the its error rate, and the other PDUs having data can be transmitted in a higher rate to increase the data processing rate.

10 Claims, 4 Drawing Sheets

METHOD OF GENERATING PROTOCOL DATA UNITS IN SPLIT MODE

BACKGROUND OF THE INVENTION

1. Field of the Invention

The present invention relates to a next generation mobile communication system, and more particularly, to a method of generating protocol data units in a split mode of a radio link control layer and transmitting them separately to a lower layer through a pair of different channels.

2. Background of the Related Art

FIG. 1 illustrates a method of data processing between open system interconnection (OSI) layers according to the related art. Generally, a radio link control (RLC) layer is a protocol layer corresponding to the second layer in an OSI. First, the RLC layer initially segments and/or concatenates one or more service data units (SDU) received from its next higher layer and generates a payload unit (PU). Then it produces a radio link control protocol data unit (RLC PDU) by attaching a RLC header to the PU generated and transmits the RLC PDU produced to its next lower layer called media access control (MAC) layer through a logical channel.

Thereafter, the MAC layer produces a transport block (TB), which is a MAC PDU, by optionally attaching a MAC header to a MAC SDU, which is the RLC PDU received from the RLC layer. Then the TB is transmitted to a physical (PHY) layer through a transport channel, and the PHY layer attaches a cyclic redundancy check (CRC) to the TB received and lastly transmits it to a receiving system though a physical channel.

There are two different types of the RLC PDUs generated in the RLC layer: a first type of PDUs including an unacknowledged mode data (UMD PDU) and the other type of PDUs including an acknowledged mode data (AMD PDU). The UMD PDUs are used when it is not required to transmit an acknowledgement signal to an originating system after PDUs are transmitted to a receiving system. On the other hand, the AMD PDUs are used when the acknowledgement signal is required to be transmitted to the originating system after PDUs are transmitted to the receiving system.

FIG. 2 and FIG. 3 illustrate structures of the UMD PDU and AMD PDU, respectively, according to the prior art. Each PDU consists of a header portion and a PU portion which includes the data. Each header in both figures commonly includes a sequence number (SN), one or more length indicators (LI), and extension (E) fields. The header attached in FIG. 3 further includes a data/control (D/C), a polling (P), and a header extension (HE) field.

The SN field represents an order number of each PDU and has a size of 7 bits for the UMD PDU and 12 bits for the AMD PDU. The LI forms boundaries between the RLC SDUs if the PDU has more than one SDU and has a size of 7 bits or 15 bits. The E field indicates what the next following field is and has a size of one bit. The D/C field indicates whether the corresponding PDU contains data or control information. The P field requests the receiving system to send a status report and has a size of one bit. The PU includes a data field and a padding (PAD) field or a piggyback status PDU field. The data field includes the SDUs transmitted from the upper layer, and the padding is performed to make the size of each PDU in octet units. The AMD PDU sometimes is attached with the piggyback status PDU field instead of the PAD field and gets transmitted to a lower layer.

Since the header and data portions of the RLC PDU get transmitted together according to the prior art, an error rate of the header portion is always same as that of the data portion for each PDU. When it is desired to separately transmit the header portion of a PDU at a lower rate than the rate of the data portion for each PDU, the prior art technique cannot be adequately used because both portions are transmitted together at a same rate. Similarly, same problem occurs when it is necessary to separately transmit a sequence number of a RLC PDU through a different channel.

SUMMARY OF THE INVENTION

Accordingly, an object of the present invention is to solve at least the problems and disadvantages of the related art.

An object of the present invention is to provide a method of dividing a protocol data unit (PDU) into a part including its sequence number (SN) and the other part including data in a split mode and generating new PDUs corresponding to each part so that the PDU including its SN could have a lower error rate.

Another object of the present invention is to provide a method of transmitting the newly generated PDUs corresponding to each divided part through different channels so that the receiving system can receive the SNs ahead of the corresponding data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the objects and in accordance with the purposes of the invention, as embodied and broadly described herein, a method of generating PDUs in a radio link control layer includes producing a payload unit by segmenting and/or concatenating one or more service data units received from a higher layer, generating a first PDU which includes a sequence number corresponding to the payload unit and a second PDU which includes the payload unit, and transmitting the first and second PDUs to a lower layer.

In another aspect of the present invention, a method of generating protocol data units in a system having a radio link control layer, a media access control layer, and a physical layer includes producing a first PDU which includes a sequence number corresponding to the payload unit and a second PDU which includes the payload unit, transmitting the first and second PDUs to the MAC layer, generating a first transport block by attaching a MAC header to the first PDU and a second transport block by attaching the MAC header to the second PDU, transmitting the first and second transport blocks to a physical layer, and transmitting the first and second transport blocks to a receiving system after attaching a cyclic redundancy check to each of the first and second transport blocks.

It is to be understood that both the foregoing general description and the following detailed description of the present invention are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein.

DETAILED DESCRIPTION OF THE INVENTION

Reference will now be made in detail to the preferred embodiments of the present invention, examples of which are illustrated in the accompanying drawings.

Figure 4:
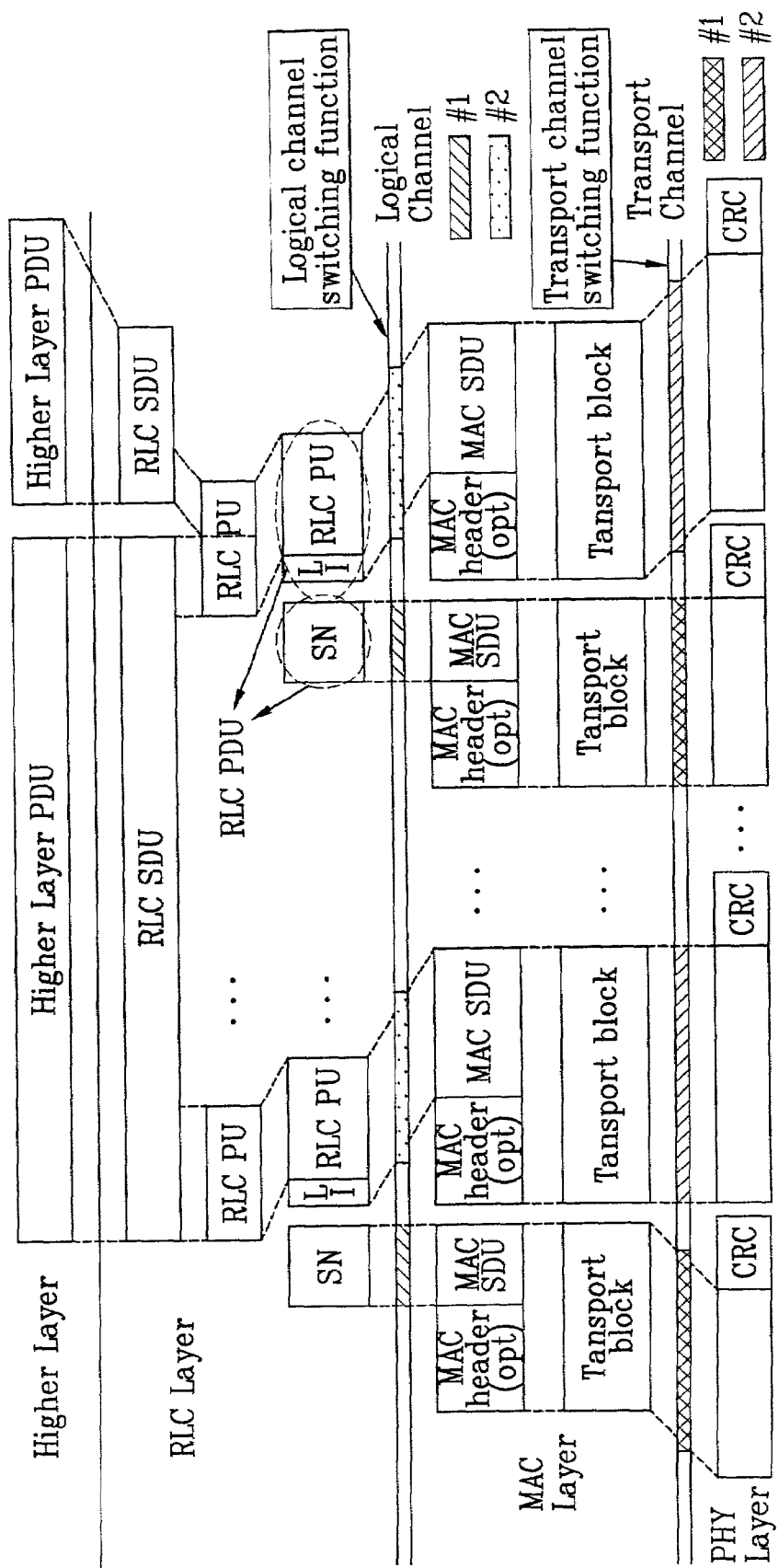
FIG. 4 illustrates a method of data processing between OSI layers according to the present invention.

FIG. 4 illustrates a method of data processing between open system interconnection (OSI) layers according to the present invention. Once a radio bearer is set, sizes and modes of protocol data units (PDU) of radio link control (RLC) and media access control (MAC) layers, a logical channel, a transport channel, and a physical channel are determined. The structure of each RLC PDU depends on whether the RLC is set to an acknowledged mode or an unacknowledged mode, and each PDU initially has a size of an arbitrary number, N octet units.

After all the parameters are determined, one or more RLC SDUs received from a higher layer are segmented into a appropriate size set by the radio bearer and/or concatenated to form a RLC payload unit (RLC PU). Each PU is then divided into two independent PDUs: a first PDU (SN PDU) including a sequence number (SN) corresponding to the PU and an extension (E) field and the other PDU (LI+PU PDU) including the PU, one or more length indicators (LI), and one or more extension (E) fields. The SN PDU contains the SN and E field if the RLC is set to an unacknowledged mode in which it is not required to transmit an acknowledgement signal to an originating system after a set of PDUs are transmitted, and it further contains a data/control (D/C), a polling (P), and a header extension (HE) field if the RLC is set to an acknowledged mode in which it is required to transmit the acknowledgement signal to the originating system.

Figure 1:
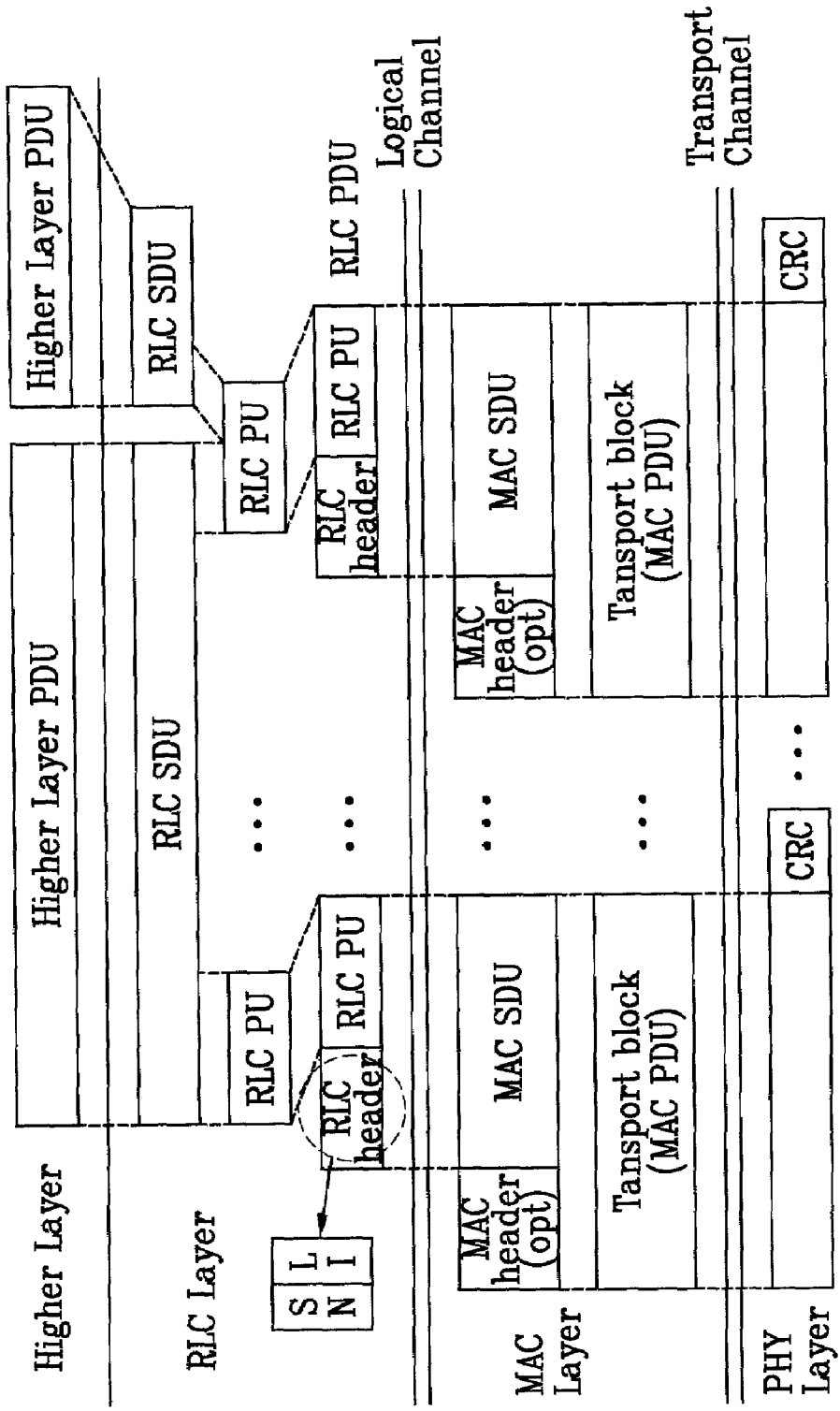
FIG. 1 illustrates a method of data processing between OSI layers according to the prior art.
Figure 2:
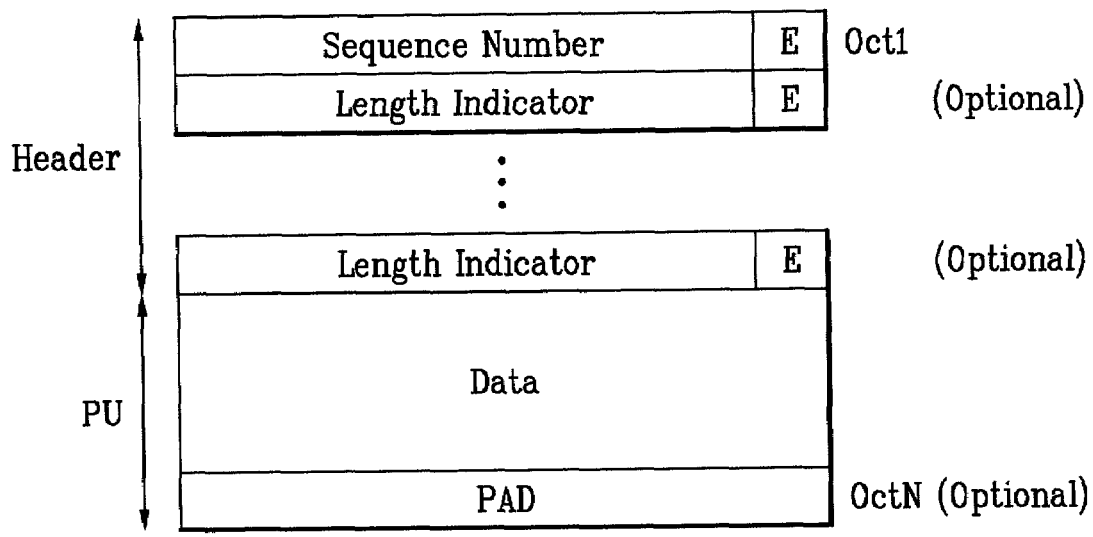
FIG. 2 illustrates a structure of a protocol data unit (PDU) having an unacknowledged mode data (UMD) according to the prior art.
Figure 3:
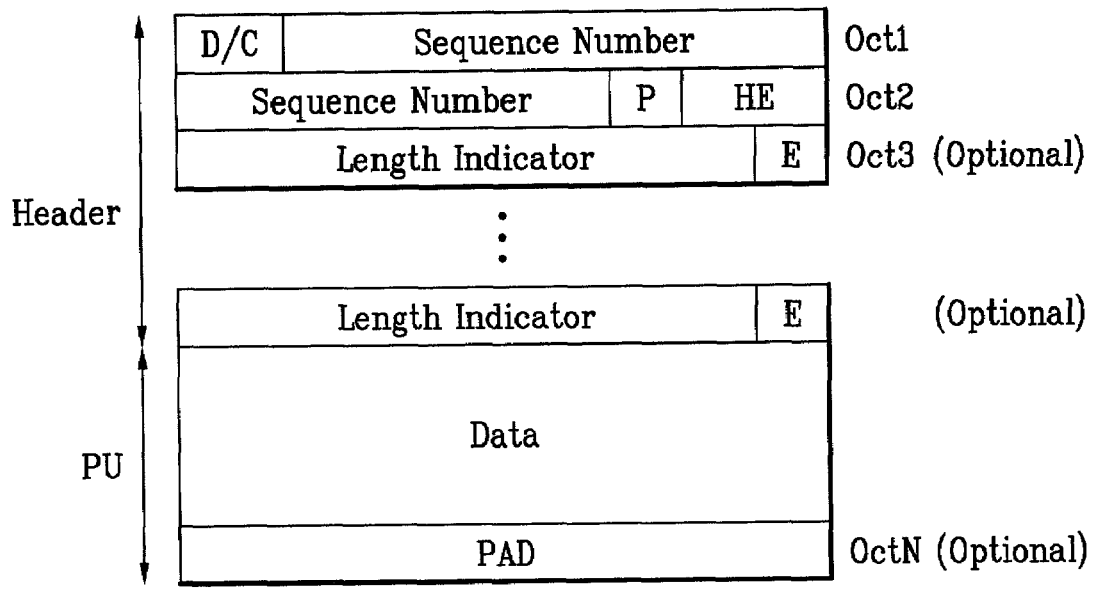
FIG. 3 illustrates a structure of a protocol data unit (PDU) having an acknowledged mode data (AMD) according to the prior art.

The SN represents an order number of each RLC PDU shown in FIG. 2 or FIG. 3 and has its size of 7 bits for a PDU containing an unacknowledged mode data (UMD PDU) and 12 bits for a PDU containing an acknowledged mode data (AMD PDU). The LI forms boundaries between the SDUs if a PDU has more than one SDU and has its size of 7 bits or 15 bits. The E field indicates whether the next field is a data or LI/E field and has a size of one bit. The data/control (D/C) field indicates whether the corresponding PDU contains data or control information. The P field is used when requesting a receiving system to send a status report and has a size of one bit. The HE field indicates whether its next field is data or LI/E field and has its size of two bits. The PU consists of data and the PAD field or a piggyback status PDU field. The LI+PU PDU has a variable length in octet units depending upon the length of the LI or PU, but the SN PDU has a fixed length (one or two octets).

The SN PDU and the LI+PU PDU get transmitted to a MAC layer through a pair of different logical channels. When a predetermined time period is elapsed after a SN PDU is transmitted through a specific logical channel, the corresponding LI+PU PDU is transmitted through another logical channel. A switching function is used in the logical channel in order to send both PDUs in different channels. For example, in order to continuously keep switching between a channel #1 and channel #2 for transmitting the SN PDU and the LI+PU PDU, respectively, the RLC layer must have a logical channel function.

The MAC layer considers both transmitted PDUs as a single data unit and produces a transport block (TB) for each PDU after attaching a MAC header if necessary (optional). Each TB represents a MAC PDU. Similarly, the TBs produced get transmitted to a physical layer through a pair of different transport channels, so the MAC layer needs to have a transport channel switching function similar to the logical channel switching function used in the logical channel. When a predetermined time period is elapsed after a TB containing the SN is transmitted to a physical layer through a transport channel, the other TB containing the PU corresponding to the SN is transmitted through another transport channel. Therefore, the physical layer can receive information regarding the SNs even before the corresponding data are transmitted. Then each TB is attached to a cyclic redundancy check (CRC) in the physical layer for detecting errors and transmitted to the receiving system. Thereafter, the receiving system extracts high layer data from the data received from the physical layer by inversely going through the steps shown in FIG. 4 and transmits it to its high layer.

Figure 5:
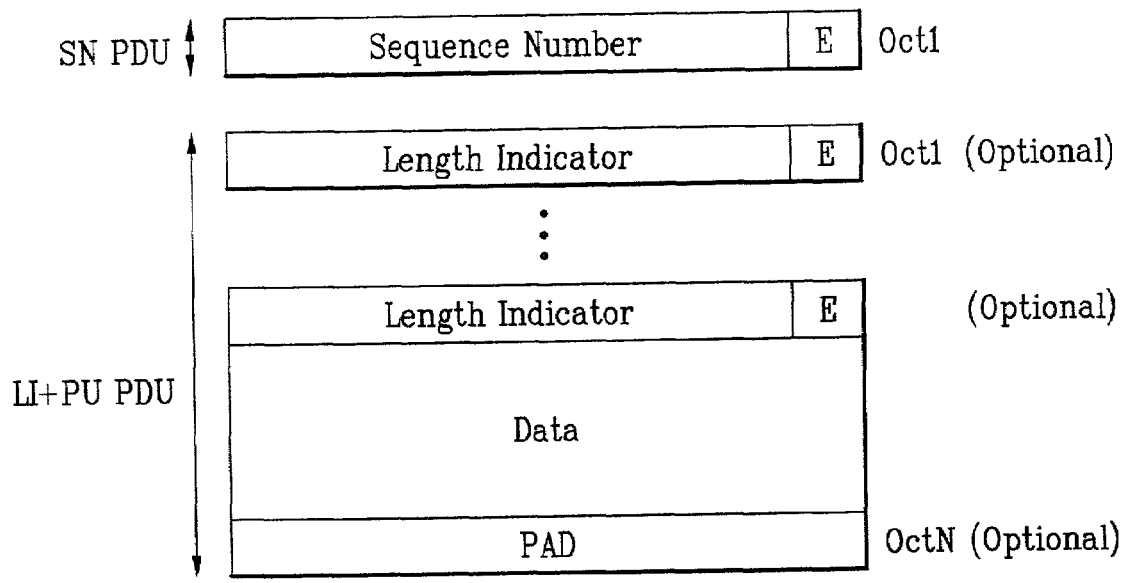
FIG. 5 illustrates a structure of a protocol data unit (PDU) having an unacknowledged mode data (UMD) according to the present invention.
Figure 6:
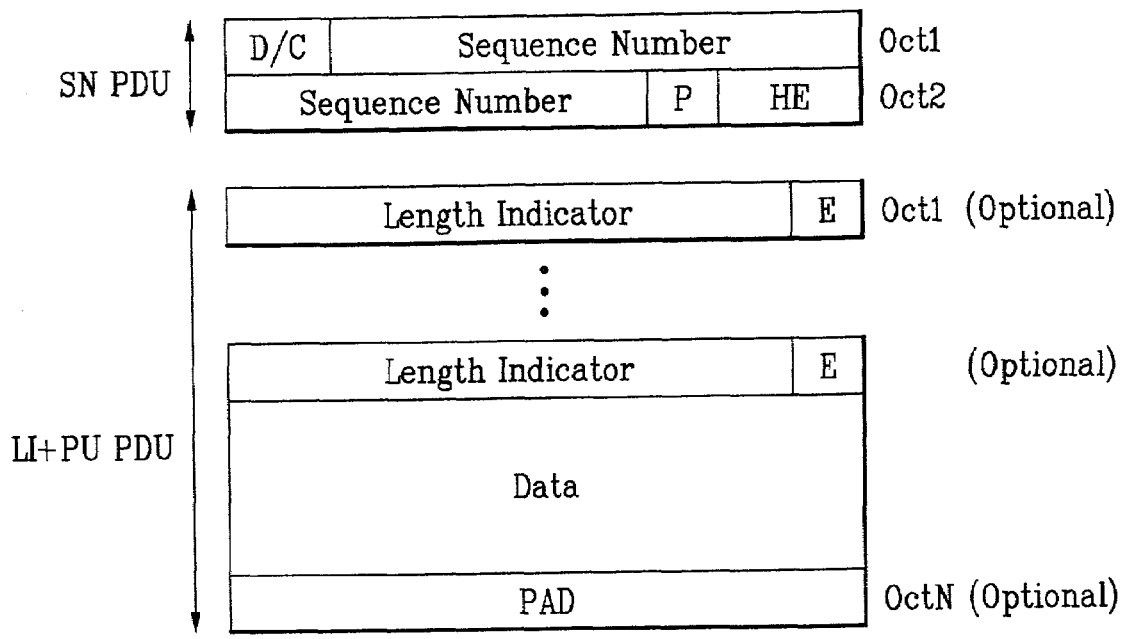
FIG. 6 illustrates a structure of a protocol data unit (PDU) having an acknowledged mode data (AMD) according to the present invention.

FIG. 5 and FIG. 6 illustrate structures of protocol data units (PDU) having an unacknowledged mode data (UMD) and an acknowledge mode data (AMD), respectively, according to the present invention. As it can be seen from both figures, the structures of SN PDUs depend upon whether the RLC is set to an unacknowledged mode or an acknowledged mode. In other words, each PDU divided into two independent PDUs: a PDU that includes a SN corresponding to the original (before division) PDU and the other PDU that doesn't. The SN PDU contains a SN and E if the RLC is set to an unacknowledged mode and further contains a D/C, P, and HE field if it is set to an acknowledged mode. The sizes of SN PDUs in FIG. 5 and FIG. 6 are one and two octets, respectively. The LI+PU PDU has a PAD field in order to maintain its size since the number of the LI and the length of data can vary.

According to the present invention, an error rate in transmitting a part of a RLC PDU including its sequence number can be reduced by dividing the RLC PDU in a split mode and separately transmitting the part including the SN in a different channel. In other words, the part including the SN can be transmitted in a low rate in order to reduce its error rate, and the data portions can be transmitted in a higher rate to increase the data processing rate. Additionally, it is possible to reduce the size of the buffer and to have an efficient error/flow control in the receiving system if the receiving system can receive the sequence numbers of data in advance. The present invention may well be applied to the method of hybrid automatic repeat request (APQ) for future packet data transmissions.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of generating protocol data units (PDU) in a radio link control (RLC) layer, the method comprising:

providing a payload unit by segmenting or concatenating one or more service data units received from a higher layer;

generating a first PDU which includes a sequence number corresponding to the payload unit and a second PDU which includes the payload unit, wherein the first PDU has fixed length, and the second PDU has variable length; and providing the first and second PDUs to a lower layer through each logical channel using a logical channel switching function, wherein the second PDU is provided through a first logical channel when a predetermined time is elapsed after the first PDU is provided through a second logical channel.

2. The method of claim 1, wherein said lower layer is a media access control layer.

3. The method of claim 1, wherein said second PDU further includes at least one pair of a length indicator and an extension field.

4. The method of claim 1, wherein said first PDU further includes an extension field if said RLC layer is set to an unacknowledged mode and further includes a data/control field, a polling field, and an extension header field if said RLC layer is set to an acknowledged mode.

5. A method of generating protocol data units (PDU) in a system having a radio link control (RLC) layer, a media access control (MAC) layer, and a physical (PHY) layer, the method comprising:

providing a payload unit by segmenting or concatenating one or more service data units provided from a higher layer;

generating a first PDU which includes a sequence number corresponding to the payload unit and a second PDU which includes the payload unit; wherein the first PDU has fixed length, and the second PDU has variable length; and providing the first and second PDUs to the MAC layer through each logical channel using a logical channel switching function; wherein the second PDU is provided through a first logical channel when a predetermined time is elapsed after the first PDU is provided through a second logical channel generating a first transport block by attaching a MAC header to the first PDU and a second transport block by attaching the MAC header to the second PDU;

providing the first and second transport blocks to the PHY layer through each transport channel using a transport channel switching function; and transmitting the first and second transport blocks to a receiving system after attaching a cyclic redundancy check to each of the first and second transport blocks.

6. The method of claim 5, wherein said second PDU further includes at least one pair of a length indicator and an extension field.

7. The method of claim 5, wherein said first PDU further includes an extension field if said RLC layer is set to an unacknowledged mode and further includes a data/control field, a polling field, and an extension header field if said RLC layer is set to an acknowledged mode.

8. The method of claim 7, wherein a switching function is used when said first and second PDUs are separately provided through said first and second logical channels.

9. The method of claim 5, wherein providing said first and second transport blocks to said PHY layer provides said first and second transport blocks separately through first and second transport channels.

10. The method of claim 9, wherein said second transport block is provided through said second transport channel when a predetermined time period is elapsed after said first transport block is provided through said first transport channel.

* * * * *